United States Patent
Kaipa et al.

(10) Patent No.: US 11,075,657 B2
(45) Date of Patent: Jul. 27, 2021

(54) QUADPLEXER AND QUADPLEXER COMPONENT

(71) Applicant: RF360 EUROPE GMBH, Munich (DE)

(72) Inventors: Chandra Sekhar Reddy Kaipa, San Diego, CA (US); Ravi Kiran Challa, San Diego, CA (US); Chee Wee Sim, San Diego, CA (US)

(73) Assignee: RF360 Europe Gmbh, Munich (DE)

( * ) Notice: Subject to any disclaimer, the term of this patent is extended or adjusted under 35 U.S.C. 154(b) by 0 days.

(21) Appl. No.: 16/636,800

(22) PCT Filed: Jun. 20, 2018

(86) PCT No.: PCT/EP2018/066421
§ 371 (c)(1),
(2) Date: Feb. 5, 2020

(87) PCT Pub. No.: WO2019/034305
PCT Pub. Date: Feb. 21, 2019

(65) Prior Publication Data
US 2020/0382145 A1 Dec. 3, 2020

(30) Foreign Application Priority Data
Aug. 18, 2017 (DE) .................. 102017118932.7

(51) Int. Cl.
*H04B 1/00* (2006.01)
*H04B 1/18* (2006.01)
(Continued)

(52) U.S. Cl.
CPC ............ *H04B 1/0057* (2013.01); *H04B 1/18* (2013.01); *H04B 1/40* (2013.01); *H04L 5/001* (2013.01)

(58) Field of Classification Search
CPC .......... H04B 1/0057; H04B 1/40; H04B 1/18; H04L 5/001
See application file for complete search history.

(56) References Cited

U.S. PATENT DOCUMENTS 9,467,191 B2   10/2016  Weissman et al.
2012/0300679 A1*  11/2012  Tsutsumi ................ H04B 1/18
                                                              370/278
(Continued)

FOREIGN PATENT DOCUMENTS

CN      106130570 A      11/2016
CN      106 685 436 A     5/2017
WO      WO-2014075099     5/2014

OTHER PUBLICATIONS

M. Li et al., "A fully matched LTE-A carrier aggregation quadplexer based on BAW and SAW technologies," 2014 IEEE International Ultrasonics Symposium, Chicago, IL, 2014, pp. 77-80, doi: 10.1109/ULTSYM.2014.0020. (Year: 2014).*

(Continued)

*Primary Examiner* — Sam K Ahn
*Assistant Examiner* — Amneet Singh

(57) ABSTRACT

A quadplexer providing improved insertion loss and pass band steepness is provided. The quadplexer comprises a first filter structure with a first filter element, a second filter structure with a second filter element and an inductive element that is electrically connected in series between common ports of the filter structures and input ports of the filter elements.

16 Claims, 13 Drawing Sheets

(51) Int. Cl.
*H04B 1/40* (2015.01)
*H04L 5/00* (2006.01)

(56) References Cited

U.S. PATENT DOCUMENTS

| | | |
|---|---|---|
| 2016/0056945 A1 | 2/2016 | Ella et al. |
| 2016/0365889 A1 | 12/2016 | Weissman et al. |
| 2017/0094662 A1* | 3/2017 | Ebihara ............ H04W 72/0453 |
| 2017/0170865 A1 | 6/2017 | Cheon |
| 2017/0201369 A1 | 7/2017 | Ella et al. |

OTHER PUBLICATIONS

PCT International Search Report and Written Opinion for PCT/EP2018/066421, dated Sep. 27, 2018.

* cited by examiner

Band 12 TX Matching

Band 12 RX Matching

QUADPLEXER AND QUADPLEXER COMPONENT

CROSS-REFERENCE TO RELATED APPLICATIONS

This application is a national stage application under 35 U.S.C. 371 of PCT/EP2018/066421, filed Jun. 20, 2018, which claims the benefit of German Application No. 10 2017 118 932.7, filed Aug. 18, 2017, both of which are incorporated herein by reference in their entireties.

The present invention refers to quadplexers, in particular to quadplexer topologies, and to electrical components providing quadplexer functionality.

Quadplexers are electrical circuits that can combine and/or separate for different RF signals, each signal having its own center frequency. To that end, a quadplexer has a common port and one input port or one output port for each individual signal. Typically, a quadplexer has a common port, two input ports and two output ports. Via in input port an input signal, e.g. a transmit signal, can be received from an external circuit environment and can be led to the common port. Via an output port, e.g. a receive port, an output signal can be led from the common port to the corresponding output port and provided to an external circuit environment.

The quality of a quadplexer depends on the separation levels, i.e. the separation between different paths in the quadplexer, and to the insertion loss of the respective signal paths.

Known quadplexers utilize a shunt coil electrically connected between the common port and ground to decouple the quadplexer's RF filter elements.

However, known quadplexers show non-optimal behaviour with respect to separation levels and insertion loss. In particular, quadplexers for carrier aggregation (CA) working with frequency bands with at least one narrow gap between frequency bands have a deteriorated right skirt steepness and an unwanted high insertion loss.

Thus, a quadplexer that is compatible with carrier aggregation, has an improved right skirt steepness and a reduced insertion loss is desired.

Further, the trend towards miniaturization demands components with good electrical properties and small spatial dimensions.

Accordingly, further desired is a quadplexer component that fulfils these requirements.

To that end, a quadplexer and a quadplexer component according to the claims are provided. Dependent claims provide preferred embodiments.

The quadplexer or the quadplexer topology comprises a common port, a first filter structure and a second filter structure. The first filter structure has an input port, an output port, a common port and a first filter element with an input port. The second filter structure has an input port, an output port, a common port, and a first filter element with an input port. The common port of the quadplexer is coupled to the common port of the first filter structure and to the common port of the second filter structure. The input port of the first filter element of the first filter structure is coupled to the input port of the first filter element of the second filter structure. Further, the quadplexer comprises an inductive element. The input port of the first filter element of the first filter structure and the input port of the first filter element of the second filter structure are coupled to the common port of the quadplexer via the inductive element.

Such a topology utilizes an inductive element in a new fashion that surprisingly improves insertion loss and filter steepness, especially for carrier aggregation compatible quadplexers with a narrow band gap between adjacent frequency bands. If the quadplexer comprises one filter element as a transmit filter, then in particular the roll-off of the transmission filter is improved.

It is possible that the common port of the quadplexer is directly connected to the common port of the first filter structure and to the common port of the second filter structure. Further, it is possible that the input port of the first filter element of the first filter structure is directly connected to the input port of the first filter element of the second filter structure.

A direct connection between ports can be established by electrically connecting the ports via a conductive path, e.g. a signal conductor consisting of a conductive material such as a metal or an alloy.

It is possible that the input port of the first filter element of the first filter structure and the input port of the second filter element of the second filter structure are electrically connected to the common port of the quadplexer via the inductive element.

It is possible that the quadplexer further comprises a second filter element in the first filter structure and a second filter element in the second filter structure.

It is further possible that the first filter element of the first filter structure and the first filter element of the second filter structure are bandpass filters. If the first filter structure and/or the second filter structure comprises a second filter element, then the respective second filter element can also be a bandpass filter.

Each of the first filter element of the first filter structure, the second filter element of the first filter structure, the first filter element of the second filter structure and the second filter element of the second filter structure can be a transmit filter or a receive filter.

However, it is preferred that the first filter element of the first filter structure is a receive filter and that the first filter element of the second filter structure is a receive filter, the second filter element of the first filter structure and the second filter element of the second filter structure can be transmit filters.

Correspondingly, the first filter structure can establish a filter functionality similar to that of a duplexer. Also, the second filter structure can establish a filter functionality comparable to that of a second duplexer.

The input port of the first filter structure can be a signal port for transmit signals that can be obtained from an external circuit environment. The output port of the first filter structure can be a receive port provided to receive reception signals to an external circuit environment. Correspondingly, the input port of the second filter structure can be a transmit port provided for obtaining RF signals of an external circuit environment and the output port of the second filter structure can be a receive port via which reception signals can be provided to an external circuit environment.

External circuit environments can be amplifiers, such as low noise amplifiers for reception signals and power amplifiers for transmit signals.

Correspondingly, the quadplexer can provide two different reception signals and receive two different transmit signals. Transmit signals are combined at the common port of the quadplexer. Reception signals that are both received via the common port are distributed to the respective reception ports.

Especially when the quadplexer is suited for a carrier aggregation mode, then three or more signals selected from reception signals and receive signals can propagate simultaneously in the quadplexer while high separation levels and low insertion losses are provided.

It is possible that the quadplexer further comprises an impedance matching circuit between the first filter element of the first filter structure and the second filter element of the first filter structure. Further, it is possible that the quadplexer comprises an impedance matching circuit between the first filter element of the second filter structure and the second filter element of the second filter structure.

The impedance matching circuits within the corresponding filter structures establish impedance transformation in order to decouple the respective first and second filter elements of the corresponding filter structure for transmit and receive signals.

The impedance matching circuits can comprise impedance elements such as capacitive elements, inductive elements, networks consisting of capacitive elements and inductive elements and similar circuit elements such as strip lines.

It is possible that the second filter element of the first filter structure is coupled or directly connected to the common port of the first filter structure. Further, it is possible that the second filter element of the second filter structure is coupled or directly connected to the common port of the second filter structure.

Thus, it is possible that the impedance element electrically couples the first filter element of the first filter structure to the second filter element of the first filter structure and the first filter element of the second filter structure to the second filter element of the second filter structure.

It is possible that the first filter structure is a first duplexer and the second filter structure is a second duplexer.

It is possible that the quadplexer's filter elements are electro-acoustically active filter elements.

Electro-acoustically active filter elements can establish bandpass filters or band rejection filters with a low insertion loss in the pass band and a high separation level. Further, such filters can provide duplexers and quadplexers with high isolation levels.

Electro-acoustically active filter elements comprise electro-acoustic resonators that utilize the piezoelectric effect to convert between RF signals and acoustic waves. To that end, electrode structures and a piezoelectric material are combined in an electro-acoustic resonator and two or more electro-acoustic resonators are combined to establish an electro-acoustically active RF filter.

Resonators can be SAW resonators (SAW=surface acoustic wave), BAW resonators (BAW=bulk acoustic wave) or GBAW resonators (GBAW=guided bulk acoustic wave). In SAW resonators and in GBAW resonators interdigitated electrode fingers are arranged on a piezoelectric material, e.g. lithium tantalate or lithium niobate. In BAW resonators a piezoelectric layer is sandwiched between a bottom electrode and a bottom electrode layer and a top electrode in a top electrode layer. A BAW resonator can be an FBAR resonator (FBAR=film acoustic bulk resonator) or a SMR-type resonator. An FBAR resonator has the sandwich structure arranged above a cavity to acoustically decouple the sandwich structure from its environment. A resonator of the SMR-type has the sandwich structure arranged on an acoustic mirror comprising layers of different acoustic impedance.

It is possible that the quadplexer's filter elements comprise a ladder-type like topology. In a ladder-type topology series resonators are electrically connected in series in a signal path. Shunt resonators arranged in shunt paths electrically connect the signal path to ground.

However, DMS-filters or similar SAW topologies are also possible (DMS=double mode SAW).

It is possible that the first filter element of the first filter structure is coupled to the output port of the first filter structure and the first filter element of the second filter structure is coupled to the output port of the second filter structure.

Thus, the first filter elements are receive filters and the output ports of the corresponding filter structures are the reception ports.

It is possible that the quadplexer comprises further impedance elements. In each filter structure an impedance element can be coupled to the input port and an impedance element can be coupled to the output port Thus, it is possible that one impedance element electrically connects the output port to the first filter element and a second impedance element connects the input port to the second filter element of one or of both filter structures.

These two additional impedance elements per filter structure can provide impedance matching to provide a defined impedance, e.g. 50 ohm, at the respective port.

The above-described quadplexer topology can be realized in a quadplexer component. Correspondingly, a quadplexer component comprises a quadplexer as described above. All circuit constituents of the quadplexer are monolithically integrated in a multilayer component.

The circuit constituents are the circuit elements needed to establish the quadplexer functionality of the quadplexer. A monolithical integration provides a component with small spatial dimensions and the topology as described above allows good electrically properties despite the narrow distances between the circuit components. Thus, although circuit components and signal lines are arranged in a closed configuration, a high isolation level can be provided.

It is possible that the inductive elements are established as structured metallizations and metallization layers between dielectric layers.

It is possible that the quadplexer and the corresponding quadplexer component can be used with Band 12 and Band 26 signals. Transmission signals of Band 12 and transmission signals of Band 26 have frequency components of frequency bands that are close together. When the quadplexer should be used in a carrier aggregation mode then good electrical properties are provided despite the close proximity of the two transmission bands.

The quadplexer component can consist of a laminate module having only six laminate layers.

It is possible to combine other bands together. The transmission and/or reception frequencies, channel spacings and band gaps will largely depends on the overall specification of the design requirement.

The mentioned bands refer to the generally known standard valid at the filing date of the present application.

Central aspects of the quadplexer and details of preferred embodiments are shown in the accompanying schematic figures.

Figure 1:
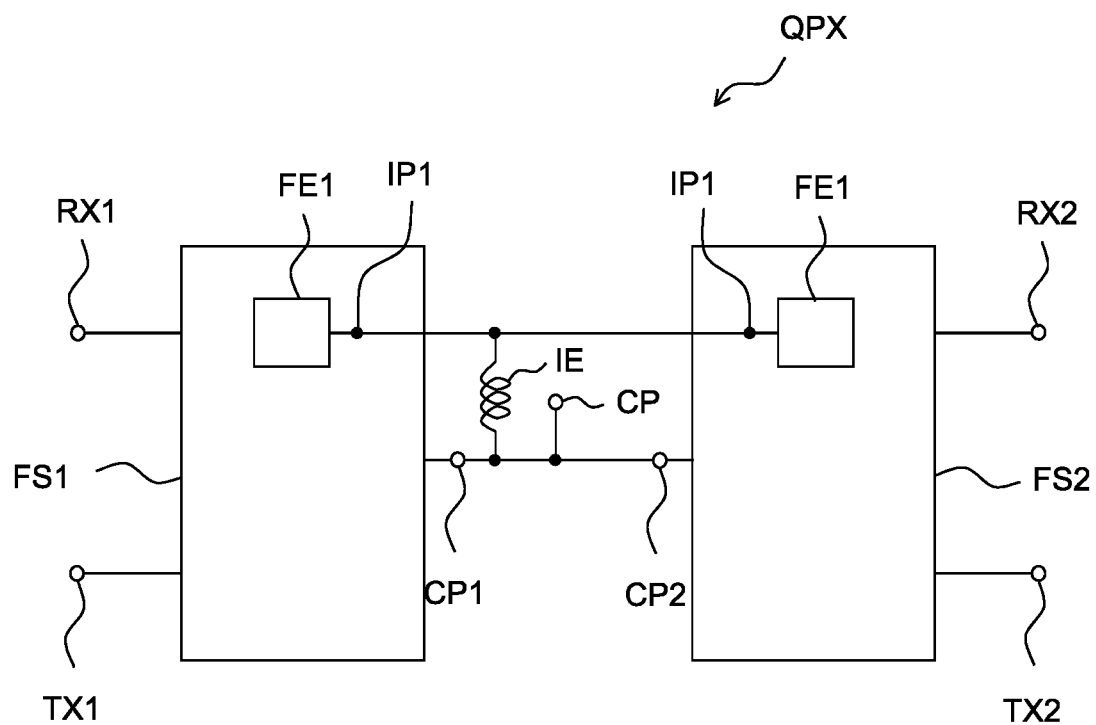
FIG. 1 shows circuit elements of an equivalent circuit diagram of the quadplexer.

FIG. 1 shows an equivalent circuit diagram with circuit elements of the quadplexer QPX. The quadplexer QPX has a first filter structure FS1 and a second filter structure FS2. The first filter structure FS1 has an input port TX1, an output port RX1 and a common port CP1. The second filter structure FS2 has an input port TX2, an output port RX2 and a common port CP2. The common port of the first filter structure FS1 and the common port of the second filter structure FS2 are coupled or connected to the common port CP of the quadplexer QPX.

Further, the first filter structure FS1 has a first filter element FE1. The second filter structure FS2 has a first filter element FE1. Both filter elements FE1 have an input port IP1. The input port IP1 of the first filter element FE1 of the first filter structure FS1 and the input port IP1 of the first filter element FE1 of the second filter structure FS2 are electrically coupled or connected. An inductive element IE electrically couples the input ports IP1 of the first filter elements FE1 to the common port CP of the quadplexer QPX.

This topology provides good electrical properties in particular when the quadplexer works in a carrier aggregation mode utilizing frequency bands having at least two pass bands with a close pass band distance.

Figure 2:
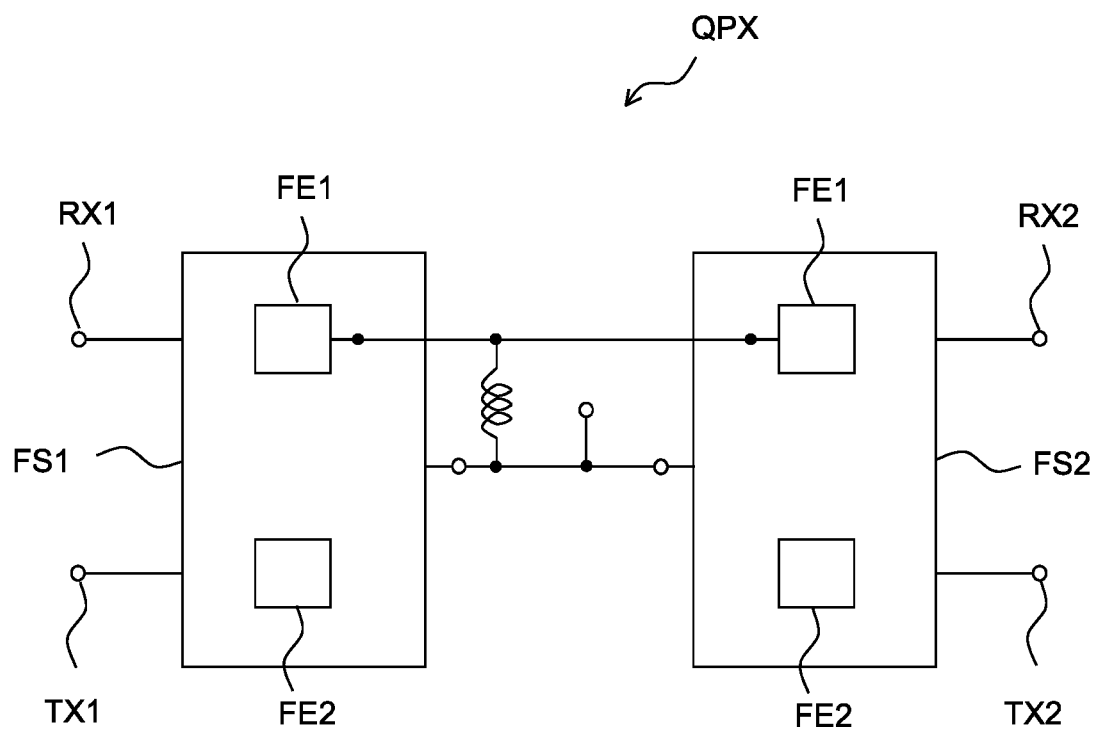
FIG. 2 shows an equivalent circuit diagram of a quadplexer comprising four filter elements.

FIG. 2 shows the possibility of having a second filter element FE2 in the first filter structure FS1 and a second filter element FE2 in the second filter structure FS2.

The first filter elements FE1 in the two filter structures can be reception filters. The two second filter elements FE2 in the two filter structures can be transmit filters.

Figure 3:
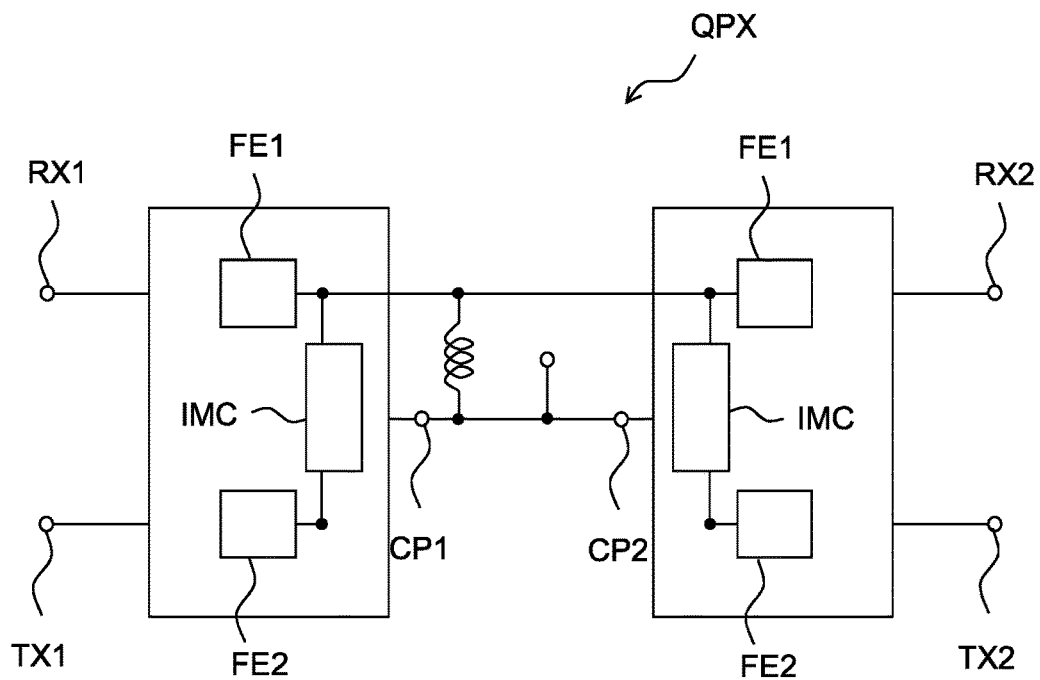
FIG. 3 shows circuit elements of an equivalent circuit diagram comprising impedance matching circuits.

FIG. 3 shows the possibility of providing impedance matching circuits IMC between the first filter element FE1 and the second filter element FE2 of the corresponding filter structures.

Figure 4:
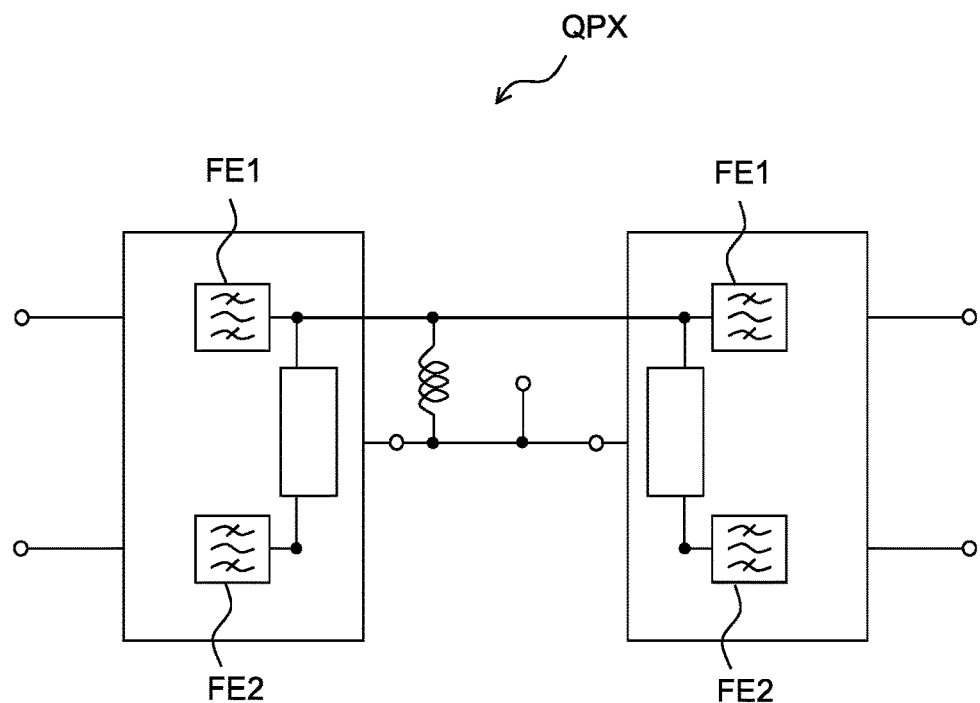
FIG. 4 shows circuit elements of an equivalent circuit diagram of a quadplexer comprising bandpass filters.

FIG. 4 shows the possibility of utilizing band pass filters as first FE1 and second FE2 filter elements in the filter structures.

Figure 5:
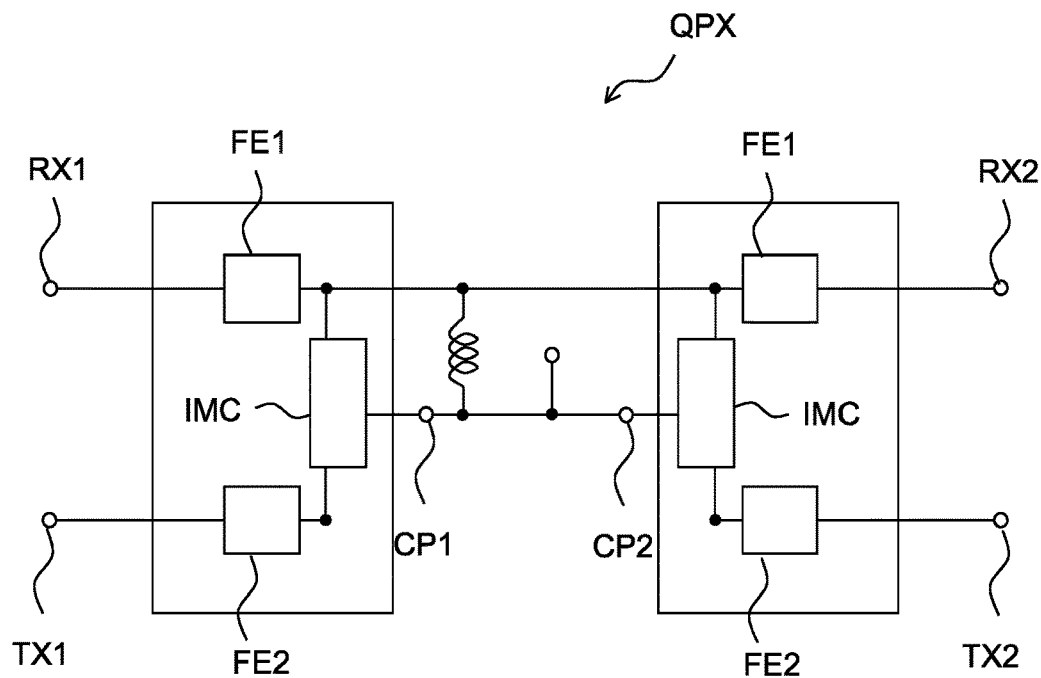
FIG. 5 shows circuit elements of an equivalent circuit diagram of a quadplexer where the common ports of the filter structures are connected to the impedance matching circuits.

FIG. 5 shows the possibility of directly connecting the common ports CP1, CP2 to the corresponding impedance matching circuits IMC of the filter structures.

Figure 6:
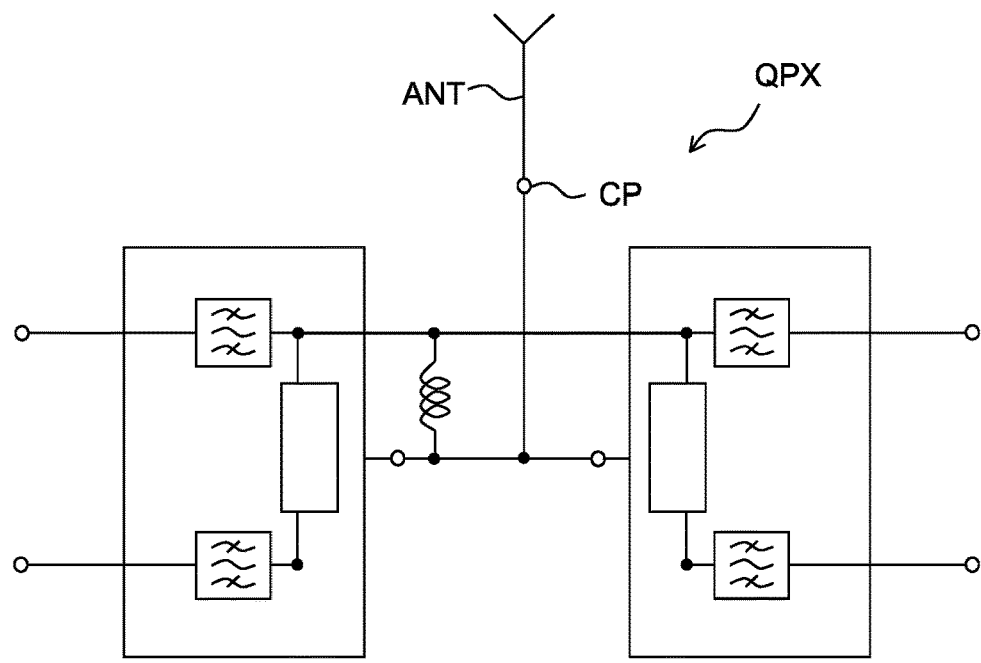
FIG. 6 shows the possibility of electrically connecting the common port of the quadplexer to an antenna.

FIG. 6 shows the common port CP being connected to an RF antenna ANT, transmit signals can be emitted and reception signals can be received via the antenna ANT.

Figure 7:
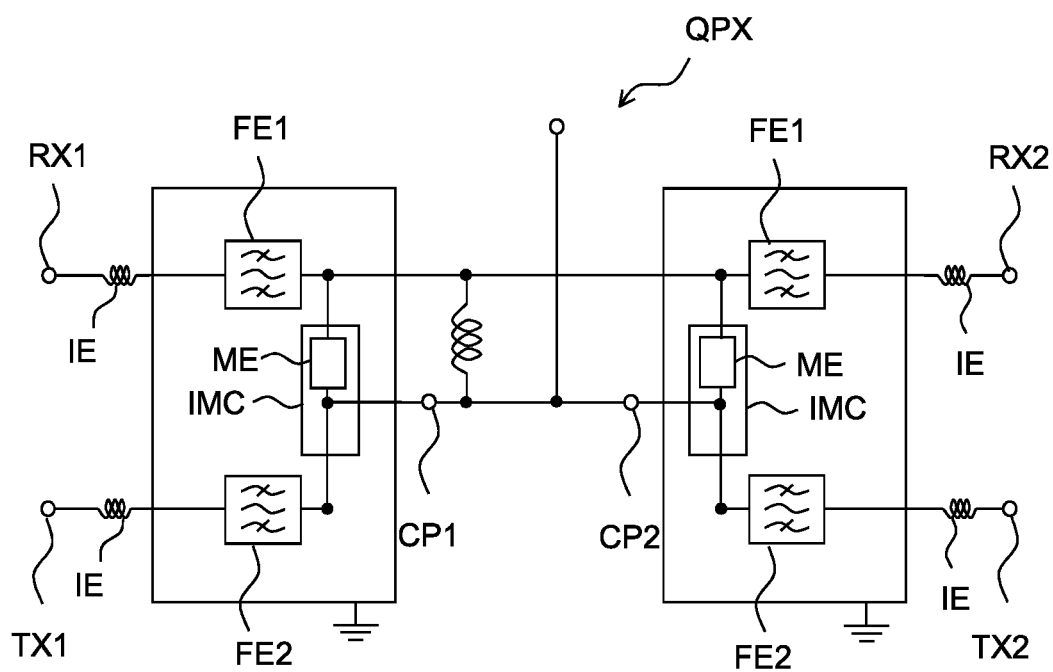
FIG. 7 shows additional possible circuit elements.

FIG. 7 shows the possibility of arranging matching elements ME in the impedance matching circuits IMC. The matching elements ME can be arranged between the input ports of the first filter elements FE1 and the common ports CP1, CP2 of the filter structures. The ports of the second filter elements FE2 of the filter structures which are output ports if the second filter elements are transmit filters, can be directly connected to the common ports of the filter structures and to the common port of the quadplexer QPX.

Further, between an input port and an output port of the filter structures and the corresponding transmit or receive filter of the filter structures, one additional inductive element IE can be provided to establish a defined port impedance, e.g. 50 ohm.

Figure 8:
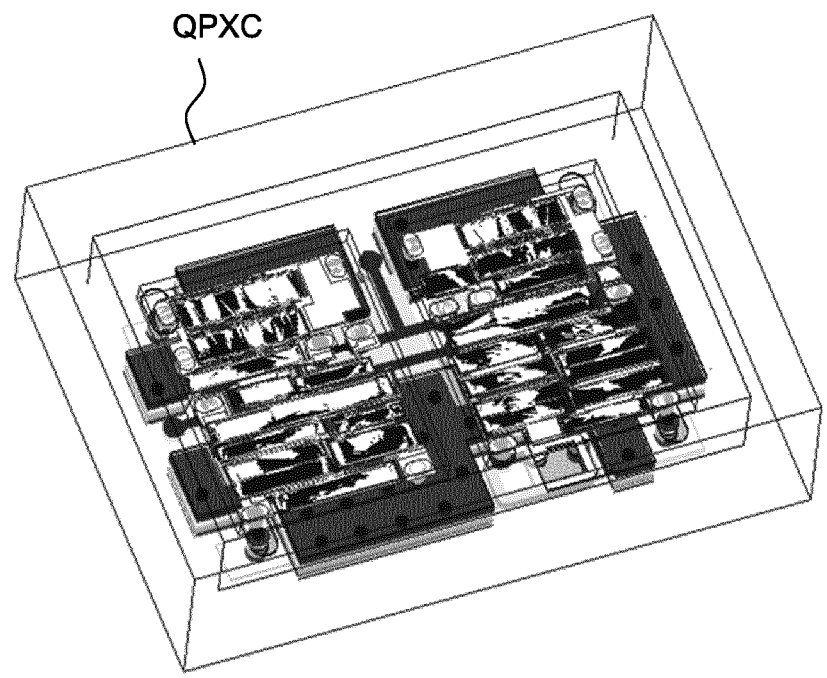
FIG. 8 shows a perspective view on circuit constituents arranged in a quadplexer component having small spatial dimensions.

FIG. 8 illustrates a perspective view onto a plurality of circuit constituents packed close together to provide small spatial dimensions while maintaining good electrical properties, in particular a high isolation level.

Figure 9:
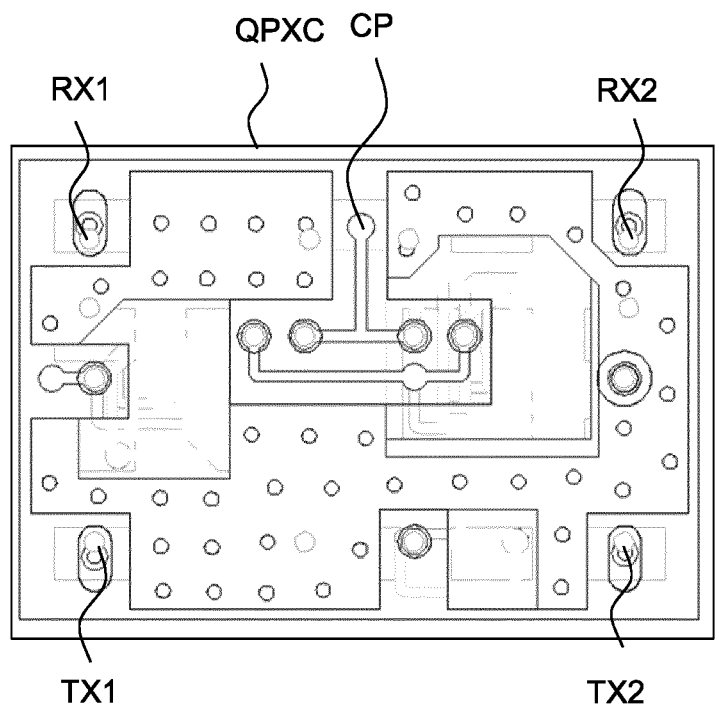
FIGS. 9 and 10 show different details of metallization layers of a quadplexer component in a horizontal plane.

FIG. 9 shows details of a metallization layer in which signal conductors are structured to electrically connect different ports of the quadplexer.

Figure 10:
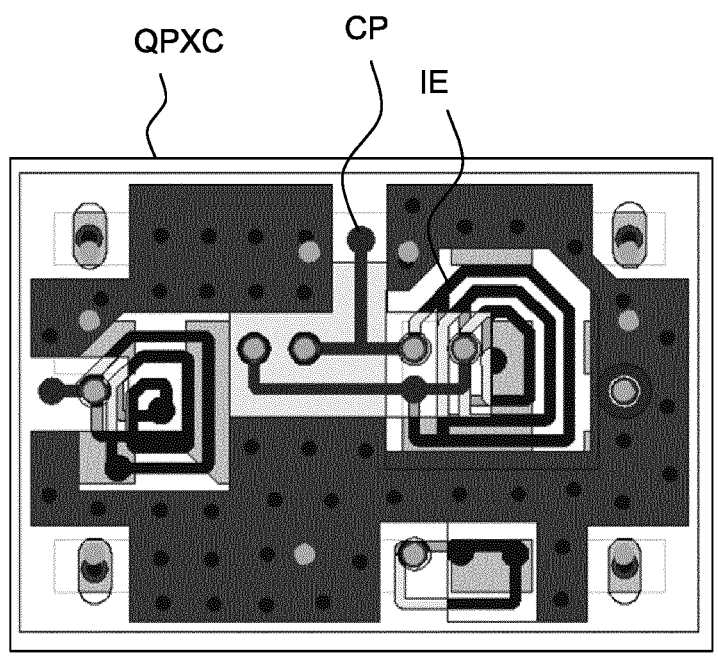

FIG. 10 illustrates the possibility of creating inductive elements in a spiral coil manner created by correspondingly shaped signal conductors in a metallization layer.

Figure 11:
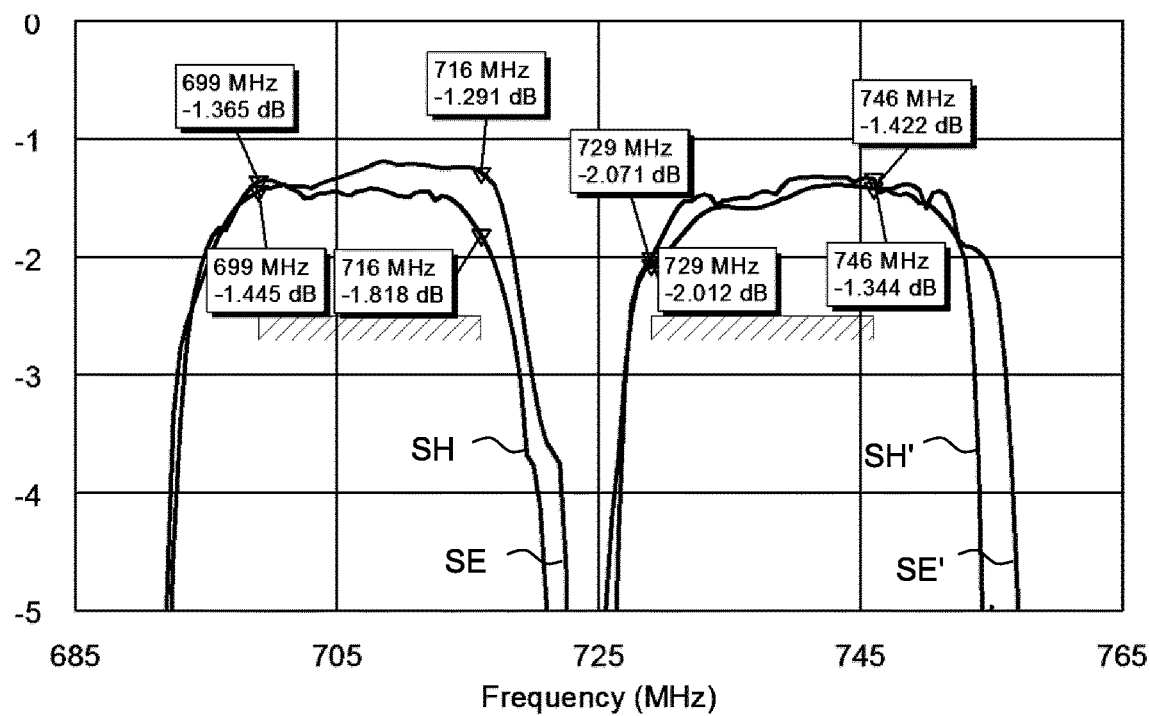
FIG. 11 shows a comparison between insertion losses of a conventional quadplexer and of the quadplexer according to the above-described embodiments for Band 12 transmissions.

FIG. 11 shows simulated insertion losses for transmission signals (lower frequencies) and reception signals (higher frequencies) for Band 12 for conventional quadplexers utilizing a shunt coil SH and for a quadplexer as described above utilizing a series coil SE. For the above-described quadplexer topology insertions losses are reduced as is clearly recognizable in curves SE (transmission signals) and SE' (reception signals). Further, the pass band steepness at the right flank for transmission signals (curve SE) is improved.

Figure 12:
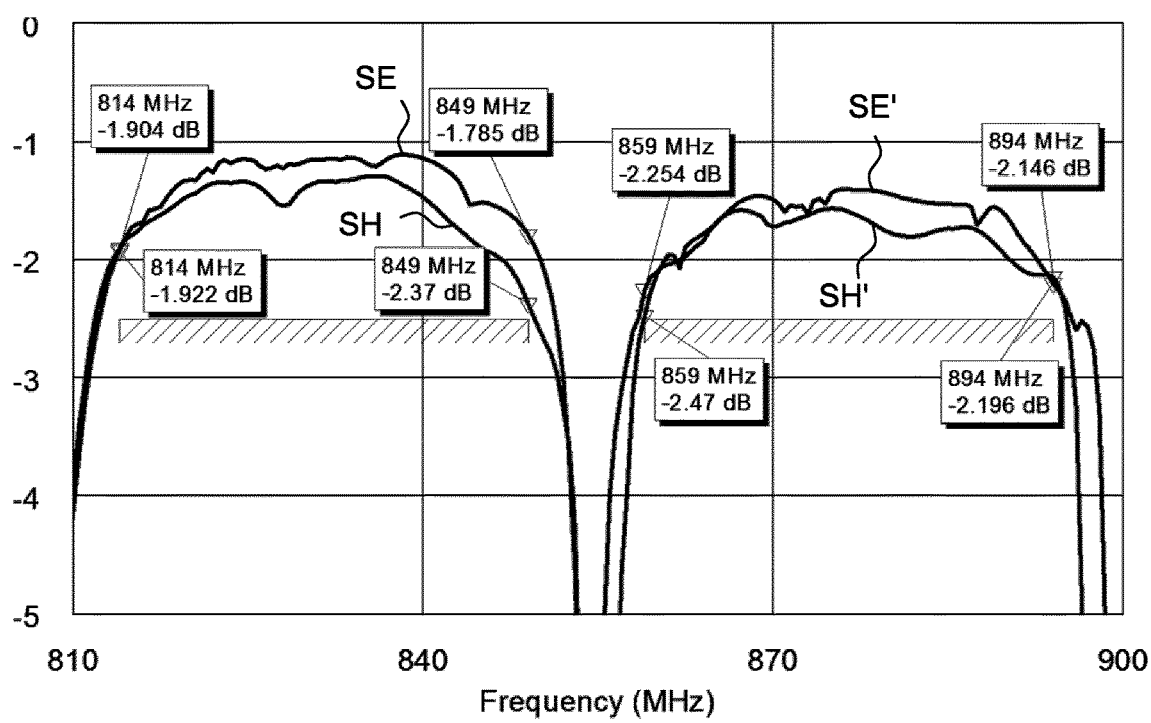
FIG. 12 shows corresponding insertion losses for Band 26.

FIG. 12 shows corresponding curves for Band 26 transmission and reception signals: curve SH denotes transmission signals of a conventional duplexer utilizing a shunt coil approach. Curve SE denotes the insertion loss for the improved quadplexer. Curves SH' and SE' show insertion losses for the corresponding reception frequencies.

Figure 13:
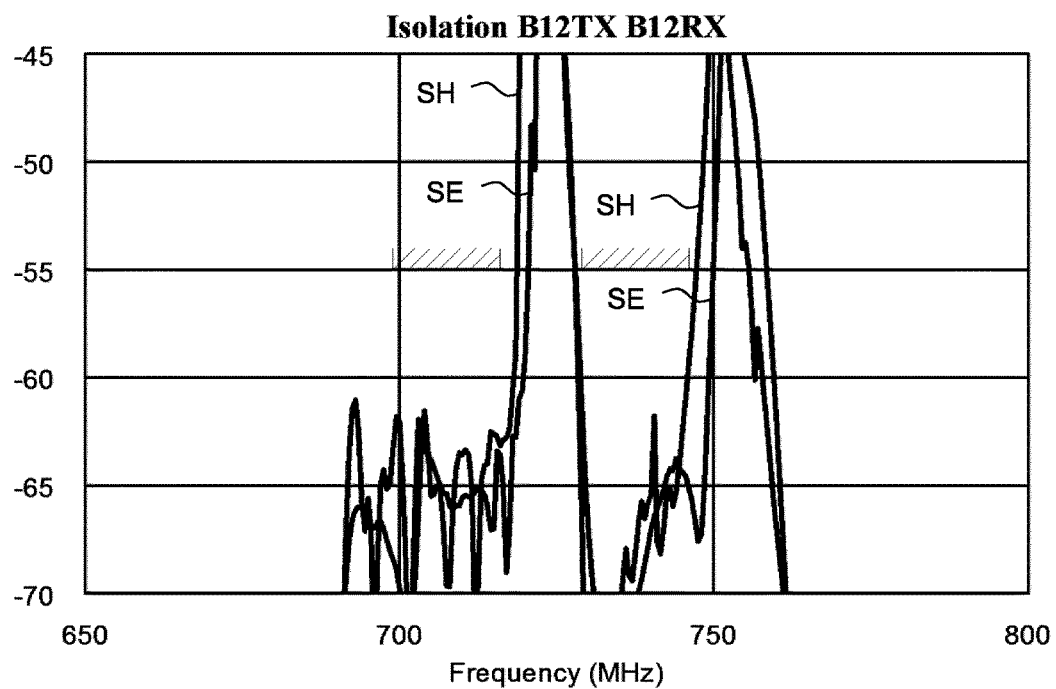
FIG. 13 shows a comparison of isolation levels for Band 12.

In FIG. 13 the isolation levels for conventional duplexer topology (curve SH) and for the improved quadplexer top (curve SE) are shown for the frequency ranges around the transmission and reception frequency of Band 12. The isolation levels are improved for the improved topology.

Figure 14:
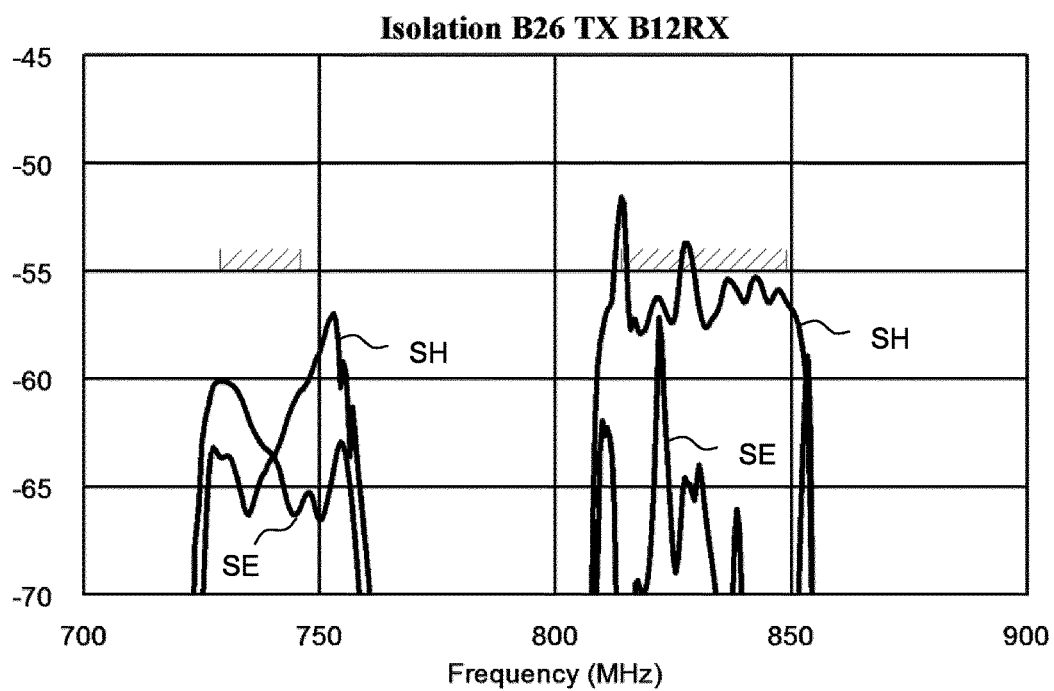
FIG. 14 shows isolation levels for a Band 26.

FIG. 14 shows the corresponding curves for the isolation in the frequency range of Band 26 transmission signals and Band 12 reception signals.

Figure 15:
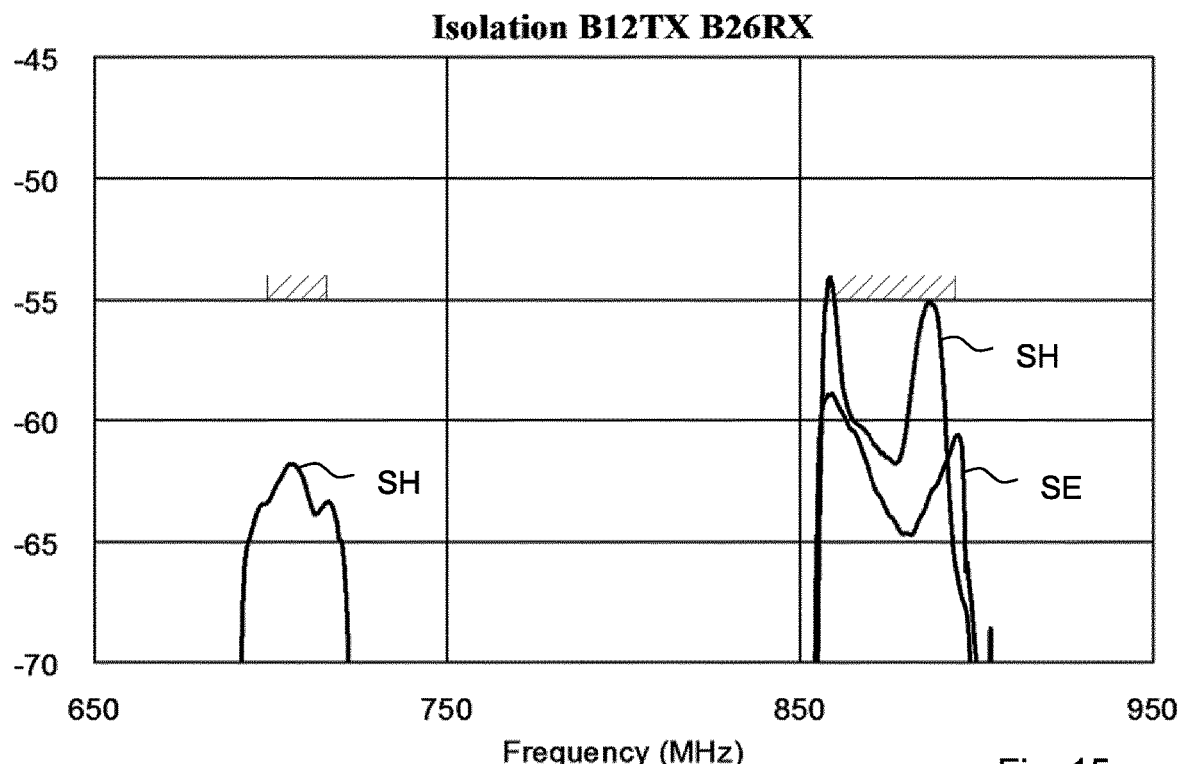
FIG. 15 shows isolation levels for the transmission signals of band 12 and reception signals of band 26.

Also, as can be seen in FIG. 15, the isolation in the frequency range around Band 12 transmission signals and reception signals of Band 26 are strongly improved for the represented quadplexer.

Figure 16:
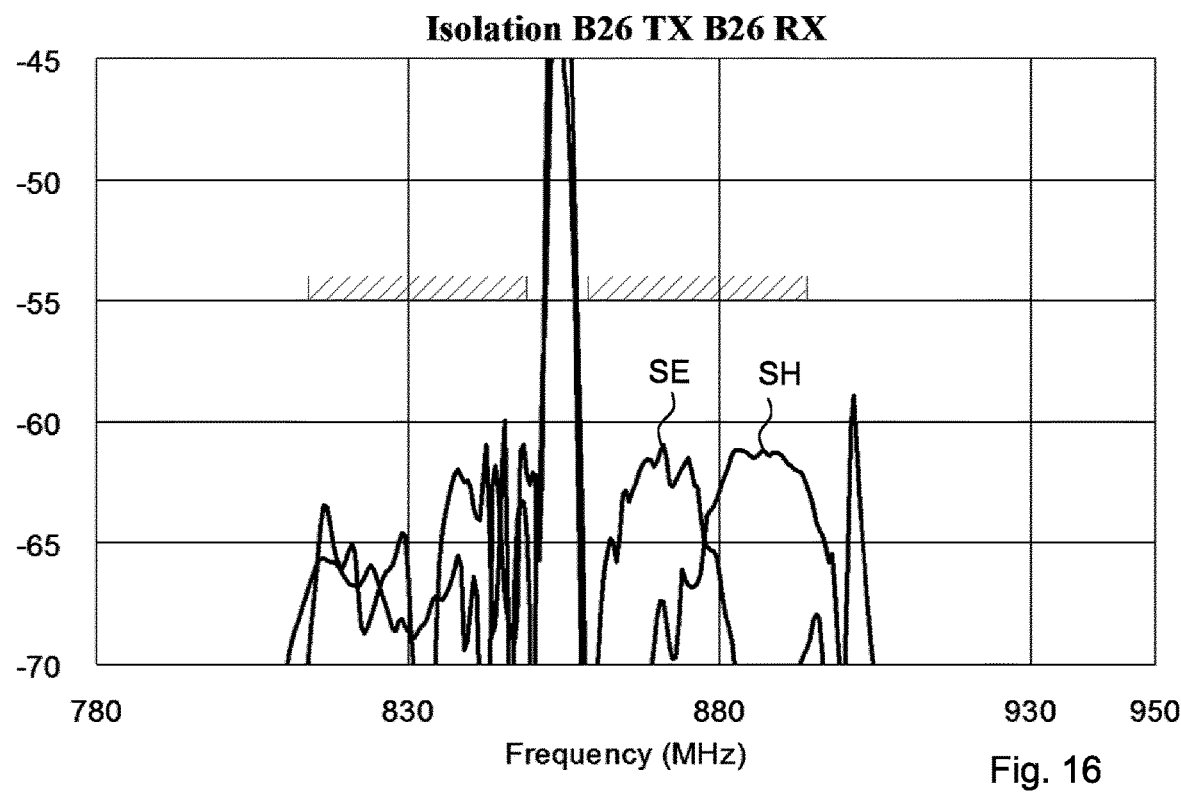
FIG. 16 shows isolation levels for band 26 transmission signals and band 26 reception signals.

As FIG. 16 shows, the topology as described above clearly fulfills the isolation requirements for the Band 26 transmission frequencies and Band 26 reception frequencies.

Figure 17:
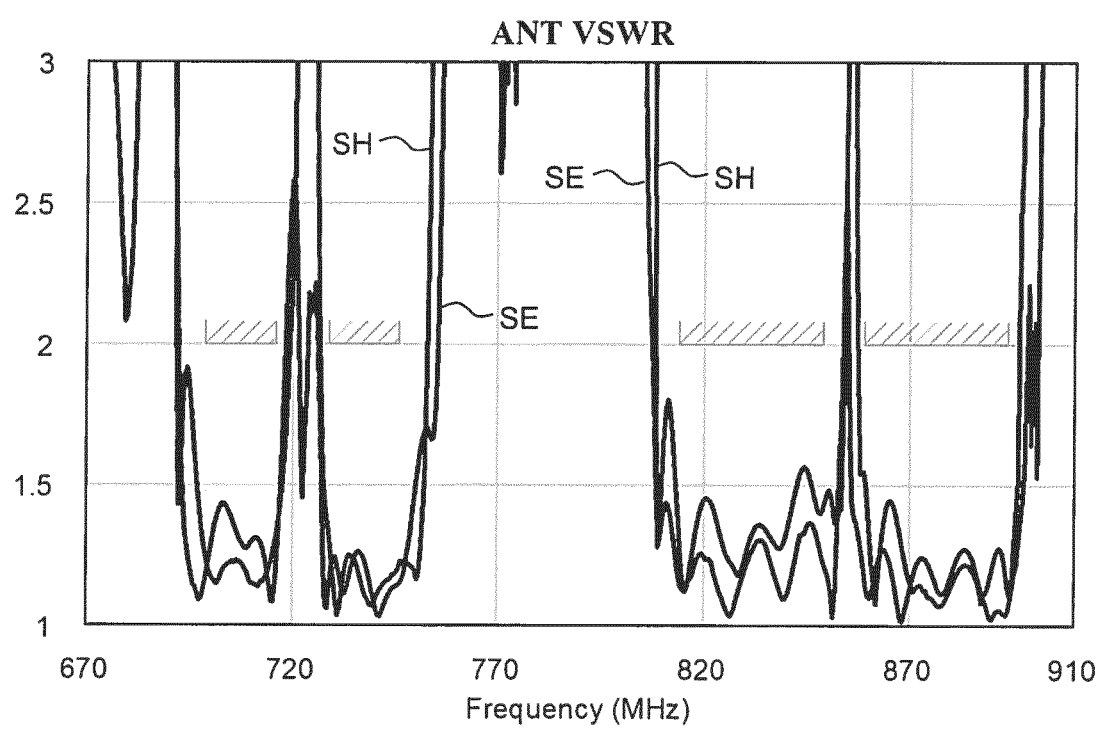
FIG. 17 shows voltage standing wave ratio values at the antenna port for conventional quadplexers and for the present quadplexer.
Figure 18:
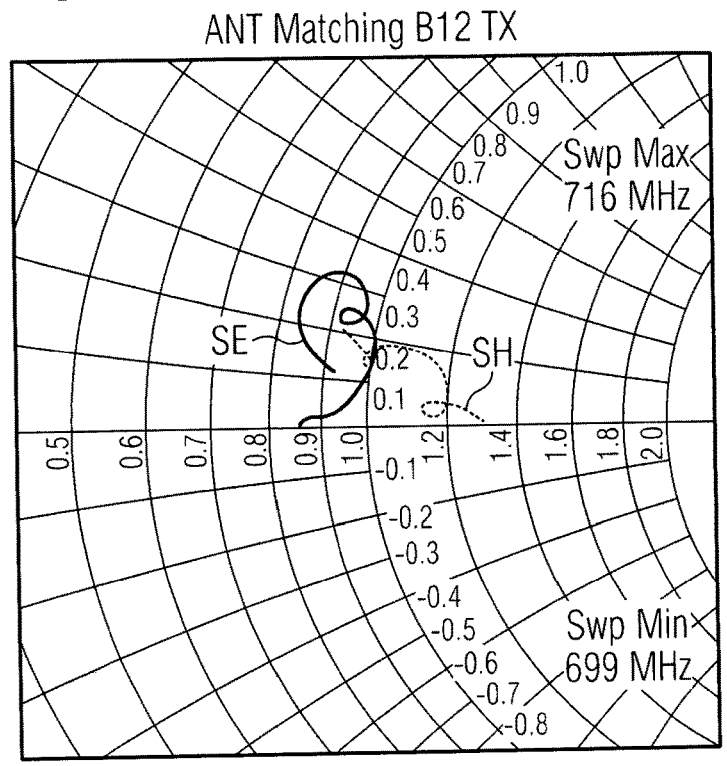
FIGS. 18 to 21 show frequency-dependent impedance-matching values.
Figure 19:
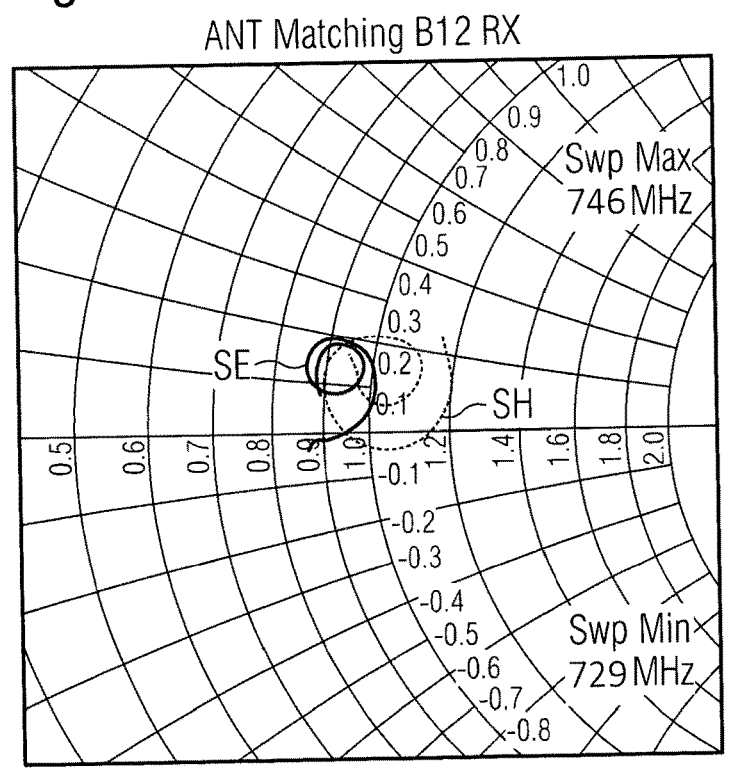
Figure 20:
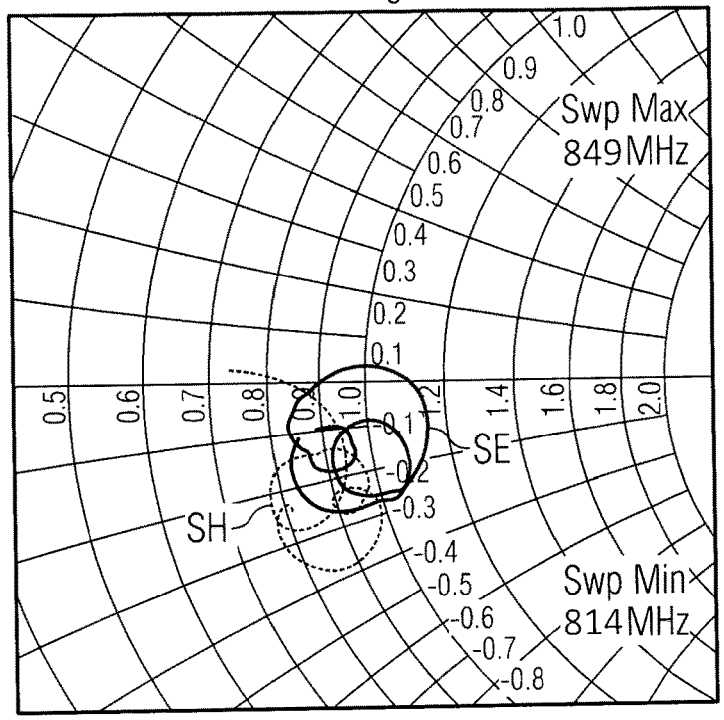
Figure 21:
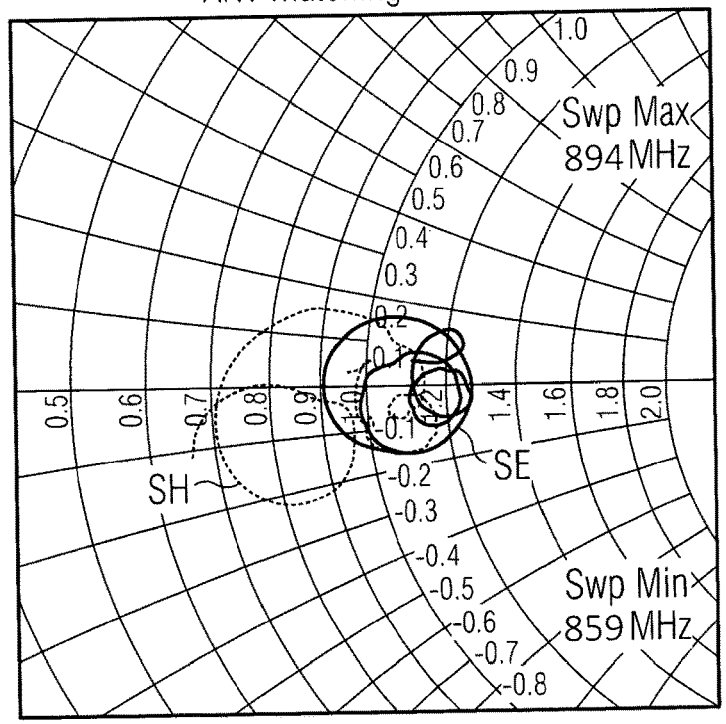
Figure 22:
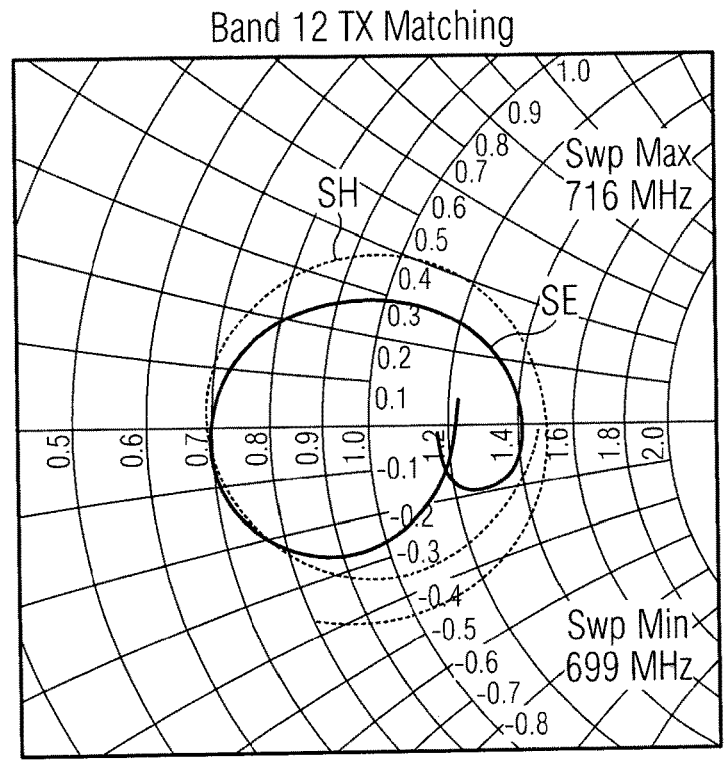
FIGS. 22 to 25 show frequency-dependent impedance values at the input and output ports of the quadplexer.
Figure 23:
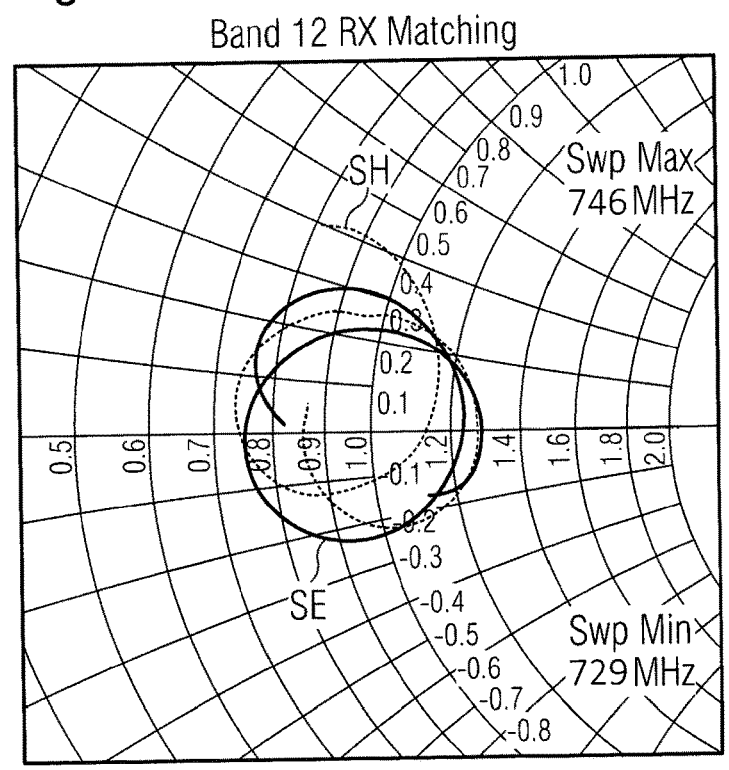
Figure 24:
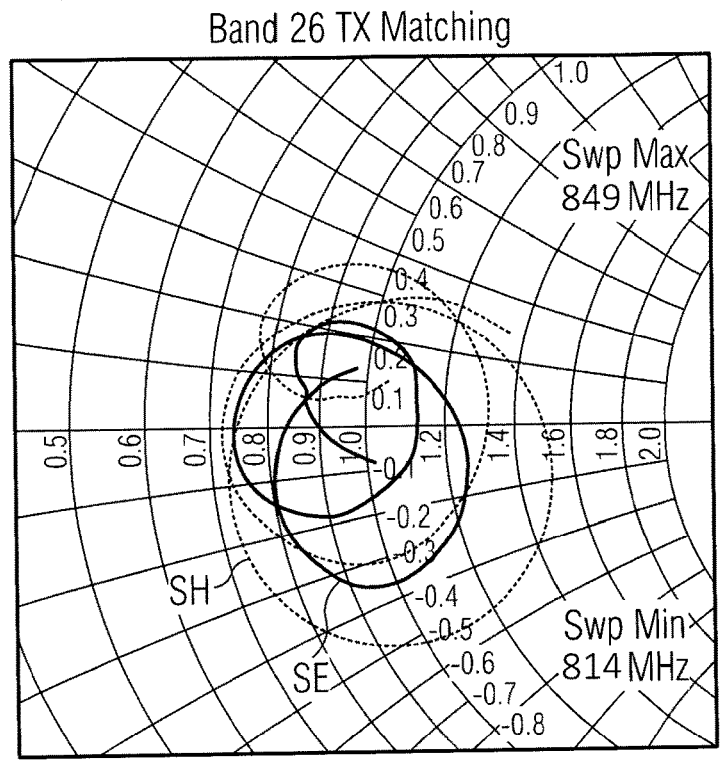
Figure 25:
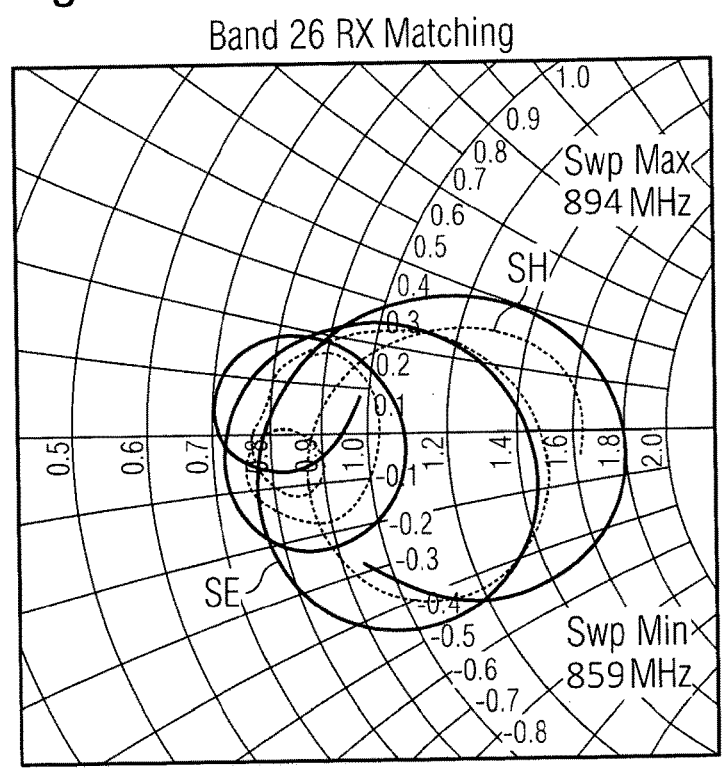

As FIG. 17 shows, voltage standing wave ratios (VSWR) at the common port of the presented quadplexer configuration also fulfill the necessary requirements.

From FIGS. 18 to 21 it can be clearly seen that the described topology provides good impedance matching at the antenna port (curves SE) for the Band 12 transmission frequencies, the Band 12 reception frequencies, the Band 26 transmission frequencies and the Band 26 reception frequencies.

FIGS. 22 to 25 show the frequency-dependent impedances at the corresponding input or output port for conventional topology (curve SH) and the present topology (curve SE). The presented topology allows for good impedance matching at each of the four ports.

The presented quadplexer and the present quadplexer component are not limited to the features described above or shown in the figures. Quadplexers can comprise further circuit components and quadplexer components can comprise further metallization layers or dielectric layers.

LIST OF REFERENCE SIGNS

ANT: RF antenna
CP: common port of the quadplexer
CP1: common port of the first filter structure
CP2: common port of the second filter structure
FE1: first filter element
FE2: second filter element of a filter structure
FS1: first filter structure
FS2: second filter structure
IE: inductive element
IMC: impedance matching circuit
IP1: input port of the first filter element
ME: matching elements
QPX: quadplexer
QPXC: quadplexer component
RX1, RX2: reception ports
SE, SE': frequency-dependent parameter of the presented quadplexer design
SH, SH': frequency-dependent parameter of a conventional quadplexer design
TX1, TX2: transmission ports

The invention claimed is:

1. A quadplexer (QPX), comprising:
a common port (CP) and an inductive element (IE),
a first filter structure (FS1) having an input port (TX1), an output port (RX1), a common port (CP1), and a first filter element (FE1) with an input port (IP1),
a second filter structure (FS2) having an input port (TX2), an output port (RX2), a common port (CP2), and a first filter element (FE1) with an input port (IP1),
where:
the common port (CP) of the quadplexer (QPX) is coupled to the common port (CP1) of the first filter structure (FS1) and to the common port (CP2) of the second filter structure (FS2),
the input port (IP1) of the first filter element (FE1) of the first filter structure (FS1) is coupled to the input port (IP1) of the first filter element (FE1) of the second filter structure (FS2),
the input port (IP1) of the first filter element (FE1) of the first filter structure (FS1) and the input port (IP1) of the first filter element (FE1) of the second filter structure (FS2) are coupled to the common port (CP) of the quadplexer (QPX) via the inductive element (IE).

2. The quadplexer according to claim 1, where the common port (CP) of the quadplexer (QPX) is directly connected to the common port (CP1) of the first filter structure (FS1) and to the common port (CP2) of the second filter structure (FS2),
the input port (IP1) of the first filter element (FE1) of the first filter structure (FS1) is directly connected to the input port (IP1) of the first filter element (FE1) of the second filter structure (FS2).

3. The quadplexer according to claim 1, further comprising a second filter element (FE2) in the first filter structure (FS1) and a second filter element (FE2) in the second filter structure (FS2).

4. The quadplexer according to claim 3, where
the first filter element (FE1) of the first filter structure (FS1),
the second filter element (FE2) of the first filter structure (FS1),
the first filter element (FE1) of the second filter structure (FS2), and
the second filter element (FE2) of the second filter structure (FS2) are bandpass filters.

5. The quadplexer according to claim 3, further comprising:
a first impedance matching circuit (IMC) between the first filter element (FE1) of the first filter structure (FS1) and the second filter element (FE2) of the first filter structure (FS1), and
a second impedance matching circuit (IMC) between the first filter element (FE1) of the second filter structure (FS2) and the second filter element (FE2) of the second filter structure (FS2).

6. The quadplexer according to claim 3, where
the second filter element (FE2) of the first filter structure (FS1) is coupled to the common port (CP1) of the first filter structure (FS1) and
the second filter element (FE2) of the second filter structure (FS2) is coupled to the common port (CP2) of the second filter structure (FS2).

7. The quadplexer according to claim 1, where the first filter structure (FS1) is a first duplexer and the second filter structure (FS2) is a second duplexer.

8. The quadplexer according to claim 1, where the first filter element (FE1) of the first filter structure (FS1) and the first filter element (FE1) of the second filter structure (FS2) are electro-acoustically active filter elements.

9. The quadplexer according to claim 1, where the first filter element (FE1) of the first filter structure (FS1) and the first filter element (FE1) of the second filter structure (FS2) each comprise a ladder-type like topology.

10. The quadplexer according to claim 1, where
the first filter element (FE1) of the first filter structure (FS1) is coupled to the output port (RX1) of the first filter structure (FS1) and
the first filter element (FE1) of the second filter structure (FS2) is coupled to the output port (RX2) of the second filter structure (FS2).

11. The quadplexer according to claim 1, wherein the first filter structure (FS1) comprises a first impedance element coupled to the input port of the first filter structure (FS1) and a second impedance element coupled to the output port of the first filter structure (FS1), wherein the second filter structure (FS2) comprises a third impedance element coupled to the input port of the second filter structure (FS2) and a fourth impedance element coupled to the output port of the second filter structure (FS2).

12. A quadplexer component (QPXC) comprising a quadplexer (QPX) according to claim 1, where all circuit constituents of the quadplexer are monolithically integrated in a multilayer component.

13. The quadplexer (QPXC) component of claim 12 where the inductive element (IE) is established as a structured metallization in a metallization layer between dielectric layers.

14. A quadplexer, comprising:
   a common port;
   an inductive element;
   a first filter structure having an input port, an output port, a common port, a first receive filter element, and a first transmit filter element; and
   a second filter structure having an input port, an output port, a common port, a second receive filter element, and a second transmit filter element, wherein
      the common port of the quadplexer is coupled to the common port of the first filter structure and to the common port of the second filter structure,
      an input of the first receive filter element of the first filter structure is coupled to an input of the second receive filter element of the second filter structure,
      the input of the first receive filter element of the first filter structure and the input of the second receive filter element of the second filter structure are coupled to the common port of the quadplexer via the inductive element,
      an output of the first transmit filter element of the first filter structure and an output of the second transmit filter of the second filter structure are each coupled to the common port of the quadplexer.

15. The quadplexer according to claim 14, further comprising:
   a first matching element coupled between the input of the first receive filter element of the first filter structure and the common port of the quadplexer; and
   a second matching element coupled between the input of the second receive filter element of the second filter structure and the common port of the quadplexer.

16. The quadplexer according to claim 14, wherein the common port is coupled to an antenna.

* * * * *